(12) United States Patent
Ruggiano et al.

(10) Patent No.: US 7,904,234 B2
(45) Date of Patent: Mar. 8, 2011

(54) METHOD FOR DETERMINING FUEL VOLATILITY AND CONSEQUENTLY PERFORMING COLD STARTING OF AN INTERNAL COMBUSTION ENGINE

(75) Inventors: Renzo Ruggiano, Bologna (IT); Henri Mazet, Chatou (FR); Anna Zambelli, Bologna (IT); Raffaele Farina, Braunschweig (DE)

(73) Assignee: Magneti Marelli Powertrain S.p.A., Corbetta (IT)

( * ) Notice: Subject to any disclaimer, the term of this patent is extended or adjusted under 35 U.S.C. 154(b) by 417 days.

(21) Appl. No.: 11/794,066

(22) PCT Filed: Dec. 21, 2005

(86) PCT No.: PCT/EP2005/057069
§ 371 (c)(1),
(2), (4) Date: Sep. 18, 2008

(87) PCT Pub. No.: WO2006/067204
PCT Pub. Date: Jun. 29, 2006

(65) Prior Publication Data
US 2009/0025689 A1   Jan. 29, 2009

(30) Foreign Application Priority Data
Dec. 23, 2004   (IT) .............................. BO2004A0800

(51) Int. Cl.
*G06F 19/00* (2006.01)
*G06G 7/70* (2006.01)
(52) U.S. Cl. .................... 701/113; 701/115; 123/179.16; 123/486; 123/491

(58) Field of Classification Search .................. 123/491, 123/492, 478, 486, 179.15, 179.16, 179.17; 701/103, 104, 113, 115
See application file for complete search history.

(56) References Cited

U.S. PATENT DOCUMENTS
5,817,923 A   10/1998   Ohsaki et al. ................ 73/35.02
(Continued)

FOREIGN PATENT DOCUMENTS
EP   1178203 A   2/2002

OTHER PUBLICATIONS
International Search Report dated Mar. 8, 2006 from PCT/US2005/057069.

*Primary Examiner* — Stephen K Cronin
*Assistant Examiner* — Anthony L Bacon
(74) *Attorney, Agent, or Firm* — Ohlandt, Greeley, Ruggiero & Perle, L.L.P.

(57) ABSTRACT

A method for determining fuel volatility and consequently performing cold starting of an internal combustion engine; in the event of cold starting, the method provides for the determination of an enrichment percentage as a function of a stored value for fuel volatility; the determination of a predicted value for starting quality before performing starting; the starting of the engine using the previously determined enrichment percentage; the determination of a measured value for starting quality; the determination of a correction value of the stored value for fuel volatility as a function of the comparison between the measured value for starting quality and the predicted value for starting quality; and the updating of the stored value for fuel volatility by applying the correction value to said stored value, so consequently modifying the amount of enrichment in force.

77 Claims, 4 Drawing Sheets

U.S. PATENT DOCUMENTS

| | | | |
|---|---|---|---|
| 6,079,396 A | 6/2000 | Ament et al. | 123/674 |
| 6,283,102 B1 | 9/2001 | Nelson et al. | 123/575 |
| 6,360,726 B1* | 3/2002 | Javaherian | 123/491 |
| 6,363,313 B1* | 3/2002 | Katoh et al. | 701/104 |
| 7,163,002 B1* | 1/2007 | Halverson et al. | 123/491 |
| 7,266,439 B2* | 9/2007 | Wang et al. | 701/106 |
| 2002/0104521 A1* | 8/2002 | Maloney et al. | 123/686 |
| 2003/0213293 A1* | 11/2003 | Lee et al. | 73/118.1 |
| 2003/0213475 A1* | 11/2003 | Robertson et al. | 123/491 |
| 2009/0107226 A1* | 4/2009 | Caterini et al. | 73/114.38 |
| 2010/0191447 A1* | 7/2010 | Gourves | 701/113 |

* cited by examiner

METHOD FOR DETERMINING FUEL VOLATILITY AND CONSEQUENTLY PERFORMING COLD STARTING OF AN INTERNAL COMBUSTION ENGINE

TECHNICAL FIELD

The present invention relates to a method for determining fuel volatility and consequently performing cold starting of an internal combustion engine.

The present invention is applied particularly advantageously to a petrol-fuelled internal combustion engine, to which the following explanations will make explicit reference without consequently restricting the general scope thereof.

BACKGROUND ART

In a modern petrol-fuelled internal combustion engine, the petrol is injected into an intake duct in proximity to the cylinders (indirect injection) or is injected inside the cylinders (direct injection).

When the engine is hot, i.e. when the engine has reached a temperature close to the operating temperature, no significant differences in engine behaviour are observed when types of petrol with different volatility values are used. On the other hand, when the engine is cold and the outside temperature is chilly (for example below 10° C.), the non-volatile portions of the petrol remain liquid after injection and do not participate in combustion; in particular, the non-volatile portions of the petrol that remain liquid are deposited on the intake duct (in indirect injection engines) and on the walls of the cylinders where they are diluted with the lubrication oil or are discharged unburned via the exhaust valves. In order to compensate for the fact that only some of the injected petrol participates in combustion, it is necessary to increase the amount of petrol injected, i.e. it is necessary to "enrich" the fuel injection.

Enrichment of petrol injection is adjusted as a function of outside temperature (the lower the temperature, the more the injection has to be enriched), and as a function of petrol volatility (the lower the volatility of the petrol, the more the injection has to be enriched). The aim of the enrichment process is to provide the minimum enrichment that is sufficient in order to permit good starting of the engine, because any further enrichment merely increases the consumption of the engine and, above all, the output of pollutants.

The volatility of a particular type of petrol is a value that indicates the readiness of said petrol to pass from the liquid state to the gaseous state and is defined as the vapour pressure that is measured when the temperature of the petrol is 37.8° C. (state of equilibrium from liquid to vapour state). Thus, when expressed as dimensioned units, the volatility of a type of petrol is a pressure and is generally expressed as psi ("pounds per square inch"); 1 psi corresponds to 68.9 hPa.

The outside temperature is an item of data that is available in modern internal combustion engines either by means of direct measurement, or by means of measuring the temperature of the liquid coolant (when the engine is cold, the temperature of the liquid coolant is substantially equal to the outside temperature).

In contrast, the volatility of the petrol is an item of data that is only available in approximate terms, because it is excessively costly and complicated to install a sensor that is capable of directly measuring the volatility of petrol, and no sufficiently accurate and reliable method has yet been proposed for indirectly determining the volatility of petrol. In this connection, it is important to note that the volatility of petrol is variable both as a function of the refinery from which the petrol originates and as a function of the time of year; in the summer months, the types of petrol sold are much less volatile than those sold in the winter months. Cold starting of engines is indeed facilitated when the ambient temperature is high, but if the petrol is particularly volatile and the outside temperature is high when petrol is dispensed, a considerable amount of petrol vapour is formed, which is potentially harmful to the health of staff and to the environment. Normally commercially available types of petrol have a volatility of between 6 and 14 psi, i.e. between 413 and 965 hPa.

U.S. Pat. No. 6,079,396A1 discloses a method for compensating the fuel volatility during the cold start of an internal combustion engine. Automotive internal combustion engine fuel volatility is estimated during cold start operations by stabilizing air admission to the engine and analysing engine speed over a modelling period following an engine cold start after engine speed has stabilized and prior to closed-loop engine operation; if engine speed deviates significantly away from an expected engine speed for the current engine intake air and fuel, a fuel volatility deviation is diagnosed. The magnitude of the fuel volatility deviation away from a nominal fuel volatility is determined as a function of the magnitude of the engine speed deviation; a fuel volatility correction value is updated as a function of the engine speed deviation and is applied throughout an ignition cycle, including during the modelling period to compensate for the fuel volatility deviation EP1178203A1 discloses an adaptive same-ignition-cycle passive method for the real-time detection and compensation of fuel volatility (or equivalently, the fuel driveability index) during cold start of a multi-cylinder engine. The method detects a signature of fuel volatility on engine speed immediately after engine starts to run; a local short-duration high-amplitude speed droop is associated with fuels of various volatility which can be detected within the first second after engine ignition while engine is in idle-neutral operation mode. The speed droop is uniquely correlated with the fuel driveability index value in the form of calibration tables at different temperatures; the actual fuel driveability index is thus detected and the optimum fuel enrichment/enleanment is quickly determined within few events after engine is flagged as running even before the transmission is engaged.

DISCLOSURE OF INVENTION

The aim of the present invention is to provide a method for determining fuel volatility and consequently performing cold starting of an internal combustion engine, which method does not exhibit the above-described disadvantages and, in particular, is straightforward and economic to implement.

The present invention provides a method for determining fuel volatility and consequently performing cold starting of an internal combustion engine as recited in the attached claims.

BRIEF DESCRIPTION OF THE DRAWINGS

The present invention will now be described with reference to the attached drawings, which illustrate a non-limiting embodiment of the invention, in which.

BEST MODE FOR CARRYING OUT THE INVENTION

Figure 1:
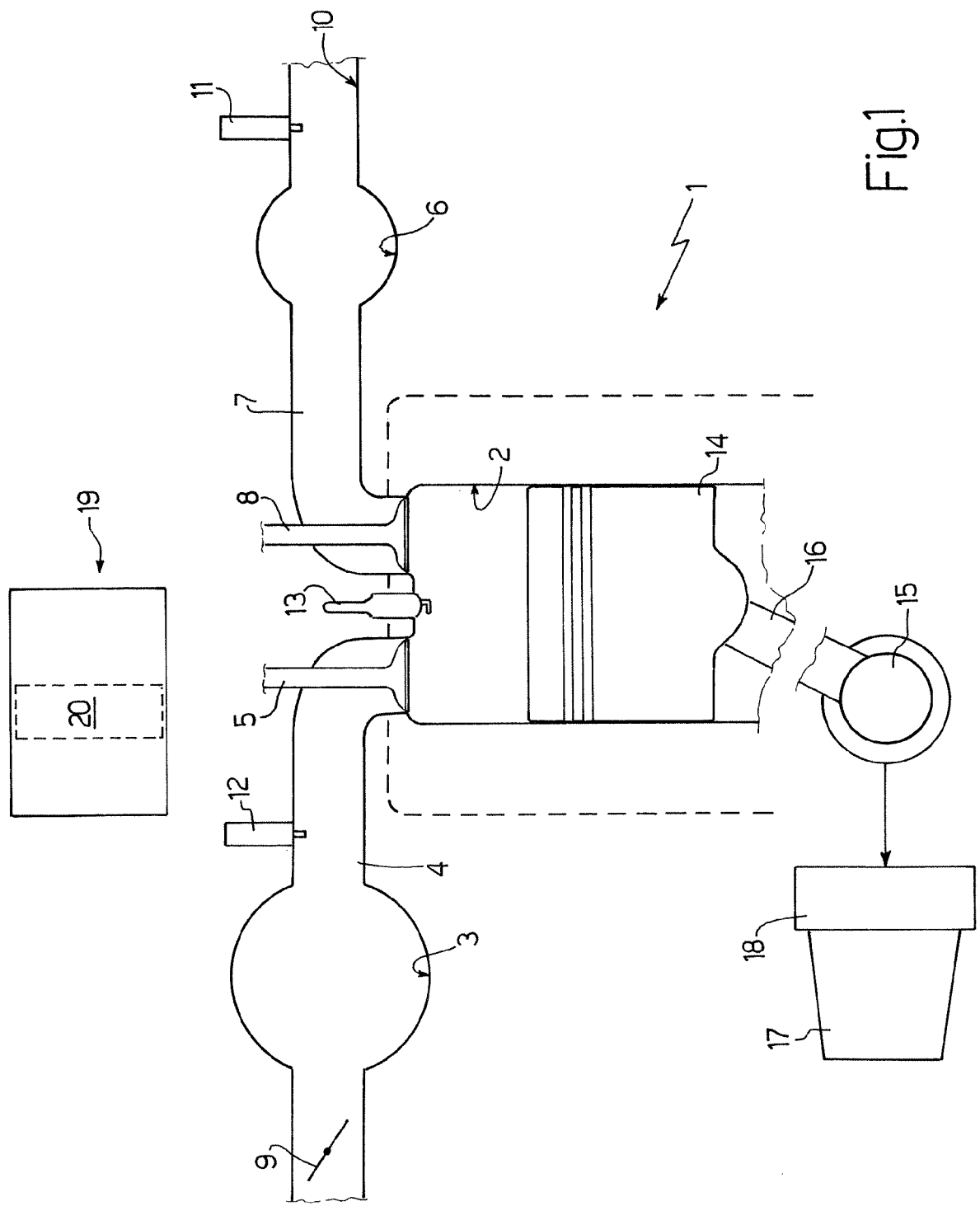
FIG. 1 is a schematic view of an internal combustion engine equipped with an electronic control unit that implements the method for determining fuel volatility that is the subject-matter of the present invention.

In FIG. 1, 1 denotes the overall internal combustion engine for a motor vehicle (not shown), which engine 1 comprises four cylinders 2 (only one of which is shown in FIG. 1). Each cylinder 2 is connected to an intake manifold 3 via a dedicated intake duct 4 controlled by at least one intake valve 5 and to an exhaust manifold 6 via a dedicated exhaust duct 7 controlled by at least one exhaust valve 8. The intake manifold 3 receives fresh air (i.e. air originating from the outside environment) via a throttle valve 9 that is adjustable between a closed position and a maximally open position. The exhaust manifold 6 leads to an exhaust system 10 equipped with one or more catalytic converters (not shown in detail) in order to discharge into the atmosphere the gases produced by combustion in the cylinders 2; at least one lambda probe 11 is arranged in the exhaust system 10.

Four injectors 12 (one for each cylinder 2) are coupled to the respective intake ducts 4 in order to inject petrol cyclically into said intake ducts 4; moreover, four spark plugs 13 (one for each cylinder 2) are coupled to the respective cylinders 2 in order to bring about cyclically the ignition of the mixture present inside said cylinders 2.

Each cylinder 2 is coupled to a respective piston 14, which is capable of sliding linearly along the cylinder 2 and is mechanically connected to a cranked driveshaft 15 by means of a connecting rod 16; in turn, the driveshaft 15 is mechanically connected to a gearbox 17 by means of an interposed clutch 18 in order to transmit drive torque to the drive wheels of the motor vehicle (not shown).

Obviously, the control strategy described below is still valid even in the presence of an engine configuration differing from that just illustrated by way of example; for example there could be a different number of cylinders, a different arrangement of the cylinders, a turbocharger could be present, airflow could be controlled by electronic management of the intake valve, etc.

Finally, the engine 1 comprises an electronic control unit 19, which is capable of supervising the operation of the engine 1. As has already been stated, during cold starting of the engine 1 it is necessary to increase the amount of petrol injected in comparison with normal operation of said engine 1 in order to compensate for the fact that only some of the petrol injected into the cold engine 1 participates in combustion. To this end, the control unit 19 comprises a processing unit 20, which is capable of controlling the degree of enrichment of petrol injection during starting of the engine 1; in particular, the processing unit 20 determines the amount and duration of enrichment of petrol injection during starting of the engine 1. The degree of enrichment of petrol injection is preferably expressed as an injection enrichment percentage % Enrich; for example, if the enrichment percentage % Enrich is equal to 20%, then the injectors 12 are actuated by the electronic control unit 19 in such a manner as to inject the additional 20% of petrol relative to standard operation of the engine 1, i.e. relative to the specified amount for the reference petrol used for nominal calibration of the system (the petrol specified for type approval testing of the car is normally used).

An alternative embodiment provides for the direct calibration of levels of enrichment (and in general any other engine control variable that has to be adapted to the fuel volatility value) for the extreme volatility values over which it is planned to operate; in this case, the values are "absolute" and not additive relative to a standard reference value. The volatility value identified by the present strategy then allows the value actually required for enrichment (and for any other relevant variables as just described) to be obtained by interpolation (and in general by a volatility function that can even be non-linear).

It is important to note that the engine 1 is deemed cold if a time interval has elapsed since the engine was last turned off that is at least equal to that required to ensure that all components of the engine (1) reach a temperature equivalent to the outside temperature and are thus no longer influenced by the heat developed by said engine 1 during its previous state of operation. By way of example, this time can be assumed to be equal to six hours.

Figure 2:
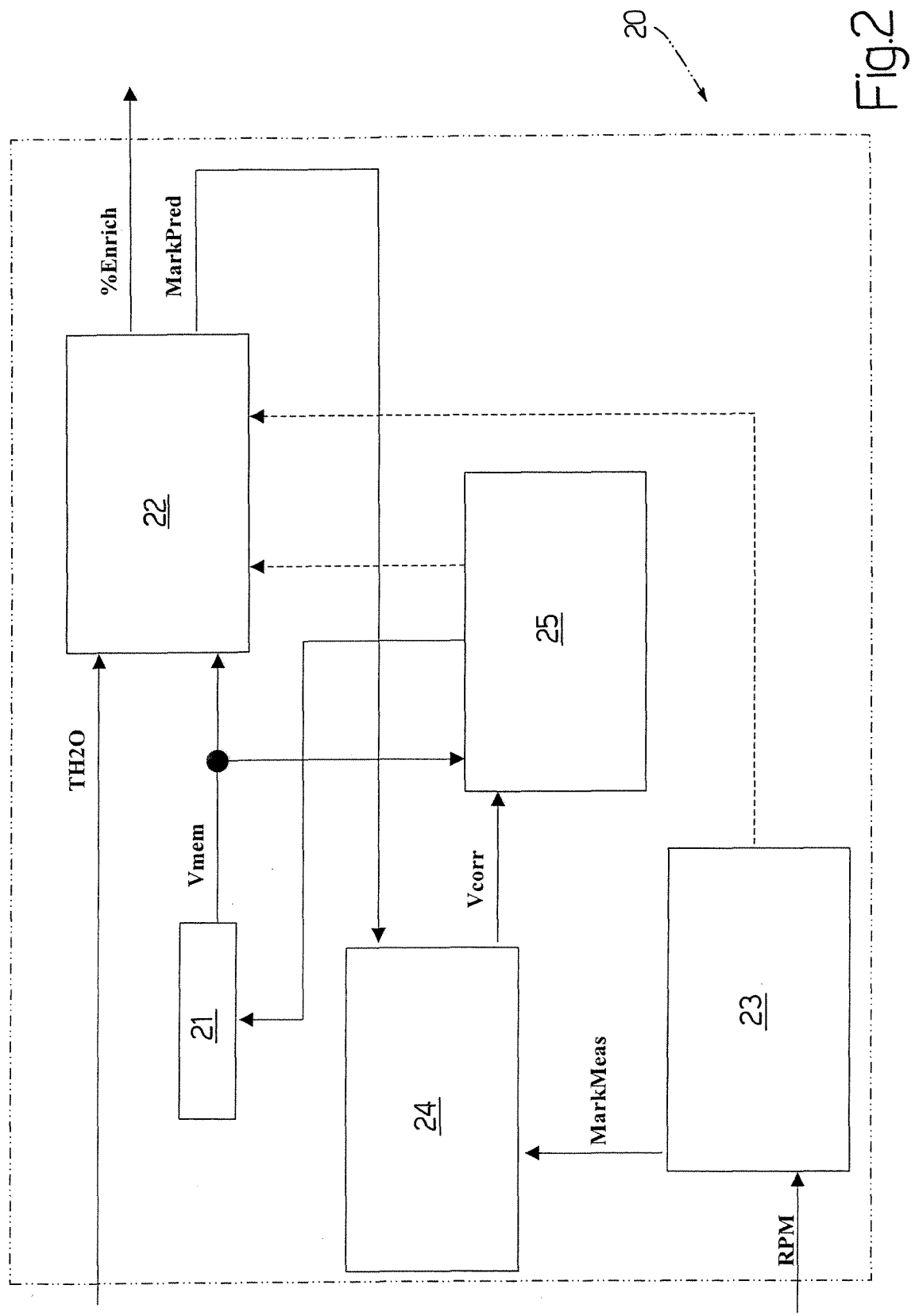
FIG. 2 is a block diagram of a processing unit of the electronic control unit in FIG. 1.

As shown in FIG. 2, the processing unit 20 comprises a memory module 21, which contains a stored value Vmem for fuel volatility, and a computing block 22 that is capable of determining the value of the injection enrichment percentage % Enrich as a function of the stored value Vmem for fuel volatility and as a function of the temperature TH2O of a liquid coolant of the engine 1. Preferably, the computing block 22 contains a three-dimensional matrix, which is determined experimentally and, for each pair comprising a stored value Vmem for fuel volatility and a temperature TH2O of the liquid coolant, provides (possibly also by means of interpolation) a corresponding value for the injection enrichment percentage % Enrich.

The enrichment percentage % Enrich varies over time from an initial, maximum absolute value provided by the computing block 22 in accordance with the previously described method, and a final, zero value. Positive percentage values actually indicate "enrichment" and conversely negative values are indicative of "thinning" and occur, for example, when the reference petrol used for nominal calibration of the system requires a richer mixture relative to the requirements of the petrol that is actually present in the tank of the vehicle. Preferably, the enrichment percentage % Enrich is implemented by means of a first contribution that acts on the objective mixture concentration and a second residual correction contribution that acts directly on the objective amount of petrol. Each contribution falls in value over time in accordance with an exponential decay law. A decay time constant of the first concentration contribution is less than a decay time constant of the second residual correction contribution, and in particular the decay time constant of the first concentration contribution is approximately one third of the decay time constant of the second residual correction contribution. The time constants are calculated as a function of the stored value (Vmem) for fuel volatility and the initial temperature (TH2O).

In response to updating of the stored value (Vmem) for fuel volatility, the enrichment profile under way is consequently modified in terms of the amount thereof and the dynamics of the extinction profile thereof. The amount of enrichment is rescaled on the basis of the ratio between the new enrichment percentage % Enrich determined on the basis of the new stored value (Vmem) for fuel volatility and the initial starting enrichment percentage. The dynamics of the extinction profile are modified by updating the decay constant values as a function of the new stored value (Vmem) for fuel volatility.

Before cold starting of the engine 1 is performed, the computing block 22 determines a predicted value MarkPred for starting quality (conventionally between 0 and 10) as a function of the stored value Vmem for fuel volatility and as a function of the temperature TH2O of the liquid coolant of the engine 1. Preferably, the computing block 22 contains a three-dimensional matrix, which is determined experimentally and, for each pair comprising a stored value Vmem for fuel volatility and a temperature TH2O of the liquid coolant, provides (possibly also by means of interpolation) a corresponding predicted value MarkPred for starting quality.

Figure 3:
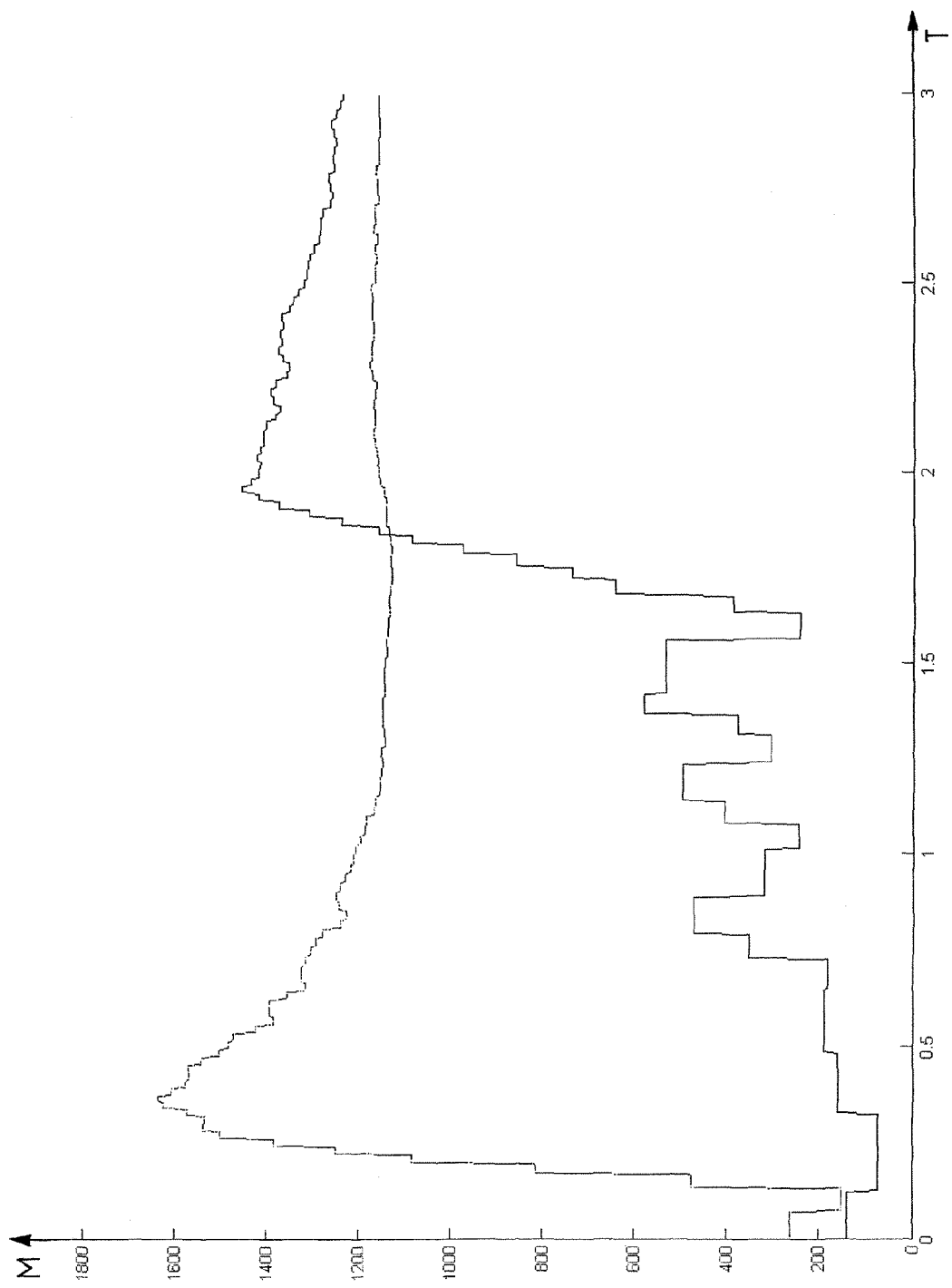
FIG. 3 is a graph showing the variation over time of the number of revolutions of the engine in FIG. 1 during two different cold starts.
Figure 4:
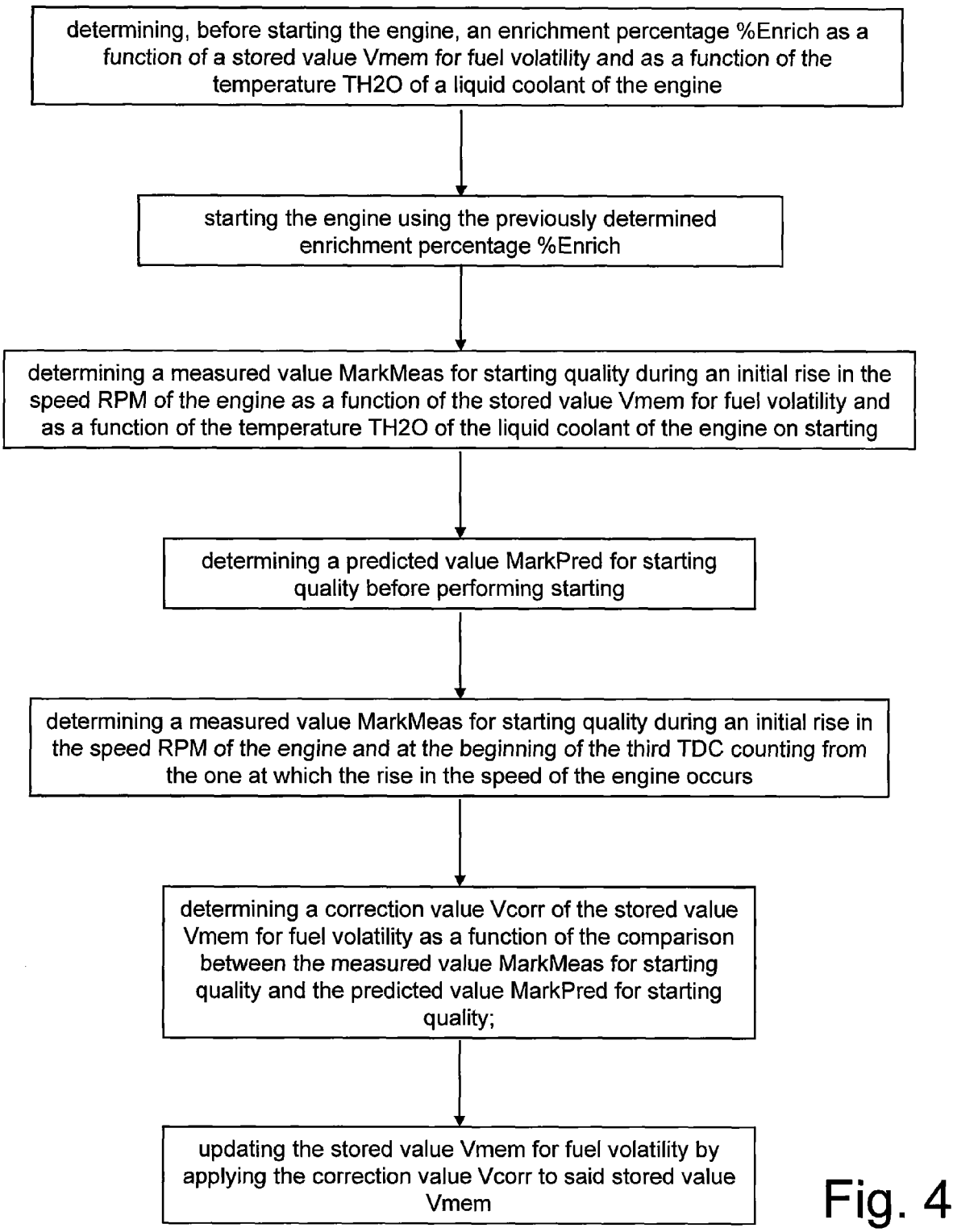
FIG. 4 is a flow chart illustrating a control method according to the present invention.

The processing unit 20 comprises a further evaluation block 23, which determines a measured value MarkMeas for starting quality (conventionally between 0 and 10) as a function of the change over time of the speed RPM of the engine 1 (i.e. the number of revolutions of the driveshaft 15 of the engine 1). In particular, during starting of the engine 1 and as shown by way of example in the graph in FIG. 3, the speed RPM of the engine 1 is initially maintained around a very low value (indicatively, between 200 and 400 revolutions per minute) brought about by the thrust imparted by an electric starter motor; subsequently, when combustion of the petrol begins to occur within the cylinders 2, the speed RPM of the engine 1 rises rapidly until it reaches a predetermined minimum value (indicatively, between 1000 and 1400 revolutions per minute). The measured value MarkMeas for starting quality is determined on completion of a given number of explosions after the beginning of the rise in the speed RPM of the engine 1, i.e. on completion of a given number of TDCs (Top Dead Centres) after the beginning of the rise in speed RPM of the engine 1. In particular, it has been observed that the measured value MarkMeas for starting quality is determined with sufficient reliability at the beginning of the third TDC counting from the one at which the rise in speed RPM of the engine 1 occurs.

Theoretical analyses reveal that it is possible to control the profile of the rise in the speed RPM of the engine 1 by means of strategies that only have an effect from the fourth effective explosion, i.e. from the first TDC after the end of the evaluation of starting; the effect of the engine 1 control strategies thus has no influence on said evaluation when starting is evaluated on the basis of the effects on the speed RPM of the engine 1 of only the first three explosions.

Alternatively, the measured value MarkMeas for starting quality could be determined as soon as the speed RPM of the engine 1 has reached a certain number of revolutions (for example 800 revolutions per minute); in other words, the starting phase is deemed to have been completed successfully as soon as the speed RPM of the engine 1 has reached a certain number of revolutions.

Either the predicted value MarkPred for starting quality, or the measured value MarkMeas for starting quality are supplied to a computing block 24, which determines a correction value Vcorr of the stored value Vmem for fuel volatility as a function of the comparison between the measured value MarkMeas for starting quality and the predicted value MarkPred for starting quality.

As a general rule, the stored value Vmem for fuel volatility is reduced if the predicted value MarkPred for starting quality is better than the measured value MarkMeas for starting quality, and the stored value Vmem for fuel volatility is increased if the predicted value MarkPred for starting quality is worse than the measured value MarkMeas for starting quality; said general rule is based on the supposition that if the predicted value MarkPred for starting quality is worse than the measured value MarkMeas for starting quality, a type of petrol that is more volatile than expected is present and vice versa. Obviously there are exceptions to the general rule described above, which exceptions will be stated in detail below.

By way of example, the correction value Vcorr can be obtained by multiplying the difference between the measured value MarkMeas for starting quality and the predicted value MarkPred for starting quality by a multiplicative constant. Said constant takes two different values depending on whether or not the difference between the measured value (MarkMeas) for starting quality and the predicted value (MarkPred) for starting quality is positive. Preferably, if the difference between the measured value MarkMeas for starting quality and the predicted value MarkPred for starting quality is in absolute terms below a given threshold value (for example 0.5), then a value of zero is assigned to the correction value Vcorr.

Either the correction value Vcorr or the stored value Vmem for fuel volatility are supplied to an updating block 25, which updates the stored value Vmem for fuel volatility contained in the memory module 21 by applying the correction value Vcorr to said stored value Vmem.

Thus, as soon as the measured value MarkMeas for starting quality has been determined, the current enrichment percentage % Enrich can be modified on the basis of the difference between the measured value MarkMeas for starting quality and the predicted value MarkPred for starting quality, i.e. on the basis of the correction value Vcorr or of the new stored value Vmem for fuel volatility that has just been calculated; in particular, the current enrichment percentage % Enrich can be incremented if the measured value MarkMeas for starting quality is significantly worse than the predicted value MarkPred for starting quality and vice versa.

It is important to point out that the correction value Vcorr is only deemed significant, and is thus applied to the stored value Vmem for fuel volatility in order to update said stored value Vmem, if some conditions apply.

The correction value Vcorr is deemed significant only in the case of a warmed-up engine or only when a time interval has elapsed since the engine was last turned off that is equal to that required to ensure that all the components of engine (1) reach a temperature equivalent to the outside temperature and are thus no longer influenced by the heat developed by said engine 1 during its previous state of operation. Furthermore, the correction value Vcorr is deemed significant only if the initial temperature TH2O of the liquid coolant of the engine 1 before starting is within a given range of temperatures within which fuel volatility affects starting quality (upper limit) and each component of the starting system is perfectly functional and behaves repeatably (lower limit); for example within a temperature range of between −25° C. and 10° C. Another feature essential to deeming the start significant is that the latter is not critical with regard to the repeatability of the evaluation thereof, i.e. that no condition occurs that is not perfectly covered by a case history of experimental data appropriate for completely defining the behaviour of the system; those starts that occur at altitude, for example, tend to be excluded.

Finally, the correction value Vcorr is not deemed significant in the presence of engine 1 malfunction signals that may have an impact on starting quality and are supplied by the standard diagnostics of the electronic control unit 19 or if a malfunction condition of the engine 1 is determined nonetheless, even if not detected by the on-board diagnostic system. Some examples of engine 1 malfunction signals that are external to the starting system and supplied by the standard diagnostics of the electronic control unit 19 are: a "low battery voltage" signal, a "misfire" signal, an "injection system fault" signal, a "petrol supply system fault", a "liquid coolant temperature sensor fault" signal, an "engine speed sensor fault" signal or a "camshaft angular position sensor fault" signal.

In order to determine an engine malfunction condition that is not signalled by the standard diagnostics of the electronic control unit 19, the updating block 25 uses an error index, which is incremented by an amount depending on the number of TDCs of each problematic start of the engine 1 that has resulted in the engine 1 coming to a stop; if the value of the error index is greater than a predetermined threshold value, an engine 1 malfunction condition is determined. The error index is set to zero after a predetermined number of consecutive and unproblematic cold starts.

An alternative method for zeroing the error index is to detect an unproblematic start (or one restart in a series) that occurs within a given maximum number of attempts; a restart is classified as the n-th attempt of a series if it occurs within a maximum time from the previous start (for example 10 minutes).

A cold start of the engine 1 is judged problematic if the number of TDCs characterising the phase that precedes the onset of established running of the engine (speed RPM of the engine 1 greater than a predetermined value, typically 800 revolutions) exceeds a predetermined threshold; a second way of judging the start to be problematic is to establish that the difference between a current estimate of the predicted value MarkPred for starting quality and the measured value MarkMeas for starting quality is greater than a predetermined threshold value.

Alternatively, the updating block 25 could determine an engine malfunction condition not signalled by the standard diagnostics of the electronic control unit 19 when the mean of the most recent measured values MarkMeas for starting quality is below a given threshold value (possibly variable as a function of outside temperature). Then again, the updating block 25 could determine an engine malfunction condition not signalled by the standard diagnostics of the electronic control unit 19 when the mean of the differences between the most recent predicted values MarkPred for starting quality and the corresponding measured values MarkMeas for starting quality is greater than a given threshold value.

With regard to the calculation of the correction value Vcorr of the stored value Vmem for fuel volatility, it is important to emphasise that, when a problematic starting condition of the engine 1 is determined, then instead of waiting for the end of the evaluation, which proceeds slowly (given the impossibility of detecting the onset of established running of the engine) and without it being possible to supply a further informative value (once the rating is very poor, there is no particular point in knowing its precise final value), an 'emergency' calculation of the value is performed. Vcorr is in fact set to a predetermined value (DeltaVemergency); consequently, an emergency value Vemergency for fuel volatility is obtained, equal to the initial starting value (Vmem) decremented by the value DeltaVemergency.

The effect of this action is, in the event of problematic starting, to supply an extra high level of enrichment with the aim of encouraging starting of the engine 1 by any means; said enrichment corresponds to a volatility value equal to the value Vemergency obtained.

The predetermined value (DeltaVemergency) is usually such that it causes Vemergency to take values close to those at the bottom of the scale for fuel volatility.

It has been stated that the correction Vcorr of the fuel volatility value Vmem is calculated only when the ambient temperature is such that the different fuel volatility can be seen to have an impact on starting quality (for example when the temperature TH2O of the liquid coolant is below 10° C.) and provided that the above-described series of conditions applies; said conditions can be concisely summarised by the fact that the engine 1 is not under restarting conditions (but sufficient time has elapsed since the previous start to warm up the engine 1), no fault detected by the standard on-board diagnostics is present, no malfunction not detected by the standard on-board diagnostics and having caused previous poor or failed starts is present; the car is not at altitude, and the temperature TH2O of the liquid coolant is not below an extremely severe value (for example −25° C.), which indicates a possible limit of repeatability and proper functioning of the components and would result in undesirable uncertainty regarding the measured rating MarkMeas for starting quality. It is important to point out that in each of the above-listed situations, a series of actions is nevertheless provided in order to attempt always to achieve starting of the engine 1.

If the engine 1 is judged to be restarting, the possibility of supplying extra enrichment in the event of problematic starting and, if appropriate, of reducing the stored value Vmem for fuel volatility is kept active. Since it is desired to limit use of the emergency action only to those cases in which it is strictly necessary, more restrictive conditions are applied for the enabling thereof, for example by using a dedicated threshold for identification of problematic starting, which is normally stricter than the nominal threshold (thus a greater threshold for the difference between the predicted value MarkPred for starting quality and the measured value MarkMeas for starting quality).

In addition, emergency restart enrichment is permitted only if it is possible to exclude with some degree of certainty the presence of system malfunctions not signalled by the standard diagnostics and responsible for the problematic starting (a situation that can be identified by examining the value of the above-described fault index) and if the stored value (Vmem) for fuel volatility is high enough to be considered potentially problematic due to the thinning that it would bring about; because it has been found that there is a fuel volatility value (designated V_recovery below) that corresponds to an enrichment capable of causing the car to start within an acceptable number of attempts (in general two) irrespective of the type of volatility actually present, the emergency action can be authorised by testing that Vmem is greater than said V_recovery.

Finally, a further condition for enabling the emergency restart action is provided by the fact that the previous start was also problematic: if the car has previously started well, it is extremely improbable that fuel volatility could be responsible for a problematic restart. The possible availability, from the electronic control unit 19, of information regarding the level of fuel in the tank would be a further factor ensuring dependability with regard to enabling emergency restart action: the fact that the level of fuel has increased indicates that the tank has been refilled and therefore that the fuel volatility value may have changed.

If, during starting/restarting of the car, a fault signal is received from the on-board diagnostics, identification of volatility is considered to be "blinded" and a fuel volatility value is used for the enrichment calculation that is more plausible and is given by the information in hand. One way of implementing the concept of plausibility is given by using the most recent stored value Vmem for fuel volatility that has given rise to a measured rating MarkMeas for starting quality, which differs from the predicted rating MarkPred for starting quality by less than the hysteresis which, as described above, leads to a zero correction value Vcorr, so actually representing a threshold for confirming the accuracy of the estimate that has previously been made. This value generally represents a fuel volatility reference (Vref) that is dependent on the values used in the previous starts.

Consequently, if an estimate cannot be made due to malfunctions that modify the behaviour of the system, the enrichment percentage (% Enrich) applied is determined as a function of the stored reference value (Vref) for fuel volatility.

The stored value Vmem for fuel volatility is set to the most plausible value even if the fault is detected in the moments following starting.

If the system detects a fault not detected by the standard diagnostics, identification leads to a recovery state which, as has already been stated, will remain in force until, for example, a first unproblematic start/restart is detected within a given maximum number of attempts. Throughout this time, the system functions in a recovery state during which the stored value Vmem for fuel volatility is set to the previously described value V_recovery, which corresponds to an enrichment capable of causing the car to start within an acceptable number of attempts (in general two) irrespective of the type of volatility actually present.

If the rating is not judged to be entirely as expected, because for example the car is at altitude or the temperature at which starting occurs is below an extremely severe value, only the possibility of supplying extra enrichment in the event of problematic starting is kept active. In this case too, a dedicated threshold is used to identify problematic starting, which is normally stricter than the nominal threshold in order to avoid having recourse to the emergency action unless it is actually necessary and the extra enrichment is enabled only if the estimated fuel volatility is greater than the value V_recovery and if it is possible to exclude with some degree of certainty the presence of system malfunctions (by evaluating the fault index described above). In the case just described, the emergency action relates solely to enrichment but, unlike the previous cases, does not include updating of the stored value Vmem for fuel volatility.

As has already been stated above, during starting of the engine 1, the speed RPM of the engine 1 is initially maintained around a very low value (indicatively, between 200 and 400 revolutions per minute) brought about by the thrust imparted by an electric starter motor; subsequently, when combustion of the petrol begins to occur within the cylinders 2, the speed RPM of the engine 1 rises rapidly until it reaches a predetermined minimum value (indicatively, between 1000 and 1400 revolutions per minute). If cold starting of the engine 1 is completed satisfactorily, the evaluation block 23 determines the measured value MarkMeas for starting quality as a function of a delay with which the rise in the speed RPM of the engine 1 occurred and/or as a function of a rate of rise in the speed RPM of the engine 1.

One possible method for determining the measured value MarkMeas for starting quality consists in assigning to the measured value MarkMeas for starting quality a constant, positive initial value of 9; if, within a given absolute number of explosions from starting, no appreciable rise in engine speed is detected, a constant penalty value (for example 0.38) is subtracted from said initial value for each TDC that elapses between the beginning of starting of the engine (1) and the onset of established running of the engine, which can be identified from the fact that the speed (RPM) of the engine (1) has exceeded a given threshold value.

The measured value (MarkMeas) for starting quality thus changes with each TDC until it converges with a final value. In this case, the adjustment value is a function of the delay with which the rise in the speed RPM of the engine 1 has occurred. Vice versa, in the event that, within a given absolute number of explosions from starting, an appreciable rise in engine speed or a significant value (greater than threshold) for the difference in revolutions between the value obtained at the n-th explosion and the most recent driven value preceding the absolute first explosion of the engine 1 is detected, an adjustment selected from a range (between +1 and −2.75) is applied to the initial value (MarkMeas) for starting quality by comparing the rate of rise in the speed RPM of the engine 1 with a reference rate of rise. In this second case, the adjustment value is thus a function of the rate of rise in the speed of the engine (rpm). The method that has just been described is particularly effective in those systems in which starting proceeds in a rigorously repeatable manner and in which it is thus possible to know exactly the TDC at which to expect the first effective explosion. In this case, it is reasonable to evaluate the rise in the engine speed within a given absolute number of explosions from starting. This is the case, for example, of a sequential phased start. In the case of a start in which there is a lower level of repeatability of behaviour between performance of the injection and the rise in the engine speed RPM (for example in "full group" starting), an alternative embodiment is preferable in which the first adjustment value, which is a function of the delay with which the rise in the speed RPM of the engine 1 occurred, is subtracted from the initial value assigned to the measured value MarkMeas for starting quality and the second adjustment value, which is a function of the rate of rise in the speed RPM of the engine 1 is summed algebraically. In this case, the method involves seeking the first effective explosion or seeking the first explosion that brings about a difference in engine speed between two consecutive TDCs that is greater than the dispersion of the drive motor. Starting from this TDC, the rate of rise is evaluated as the difference between the value taken by the engine speed after a given number of TDCs and the value preceding the TDC at which the rise in engine speed occurred. On the basis of the amount of the rate of rise, an adjustment is calculated using the method described above. For each TDC that occurs between the beginning of starting and the first effective explosion (possibly excepting the first n TDCs, where n is a predetermined number, for example 1 or 2), a constant penalty value (for example 0.38) is subtracted from the initial starting quality (MarkMeas). In the event that no significant rate of rise in the speed RPM of the engine 1 is detected, there will be only one evaluation per delay, which will be considered complete when said engine speed has exceeded a given threshold value, in effect determining the established running of the engine.

According to another embodiment, the penalty applied for each delay TDC can, in both the solutions described, be a function of the TDC itself so as to bring about a non-linear reduction in the rating.

In each case, the values of the adjustments and reference rate for the rise in the speed RPM of the engine 1 must be selected appropriately in order to tailor them to the particular features of the system in question, since each engine performs differently from other engines, and they can be calculated as a function of the starting temperature.

At the same time, it has been found that the method used by the evaluation block 23 for determining the measured value MarkMeas for starting quality must be tailored to the functional characteristics of the engine 1, or to the manner in which it is controlled.

As stated previously, the measured value MarkMeas for starting quality is conventionally between 0 and 10; for this reason, the evaluation block 23 is provided with appropriate saturation so as to maintain the measured value MarkMeas for starting quality constantly within the range 0-10.

If the cold start is problematic, the rating drops progressively until conditions are determined for identifying problematic starting conditions that result in enabling the emergency extra enrichment.

Removing the key while an evaluation is still under way and therefore with an engine that is certainly not running properly (the evaluation actually finishes by identifying a rise in engine speed or a speed RPM of the engine 1 that is greater than a given threshold, for example 800 revolutions/min) is symptomatic of a failed start and, as such, results in the rating being set to zero.

If the key is taken out after the emergency action has been activated, there is an impact only on the rating MarkMeas, which is reset appropriately, but no impact on updating the stored value Vmem for fuel volatility, which, as already stated, is decremented by a value such as to cause the stored value Vmem for fuel volatility to take a value that is representative of a minimally volatile fuel.

If the key is taken out before such action is taken, the zero value of the measured rating MarkMeas for starting quality is used for calculating the value Vcorr for correction of the stored value Vmem for fuel volatility, by means of comparison with the predicted value MarkPred for starting quality, as described previously.

If, however, the key is removed before a number of TDCs has occurred that is below a predetermined threshold value (for example 4), the rating is set to zero, but this has no effect for the purposes of updating the stored value Vmem for fuel volatility or any activation of extra enrichment; this avoids classifying an attempt that is immediately interrupted by the driver manually deactivating the starting motor as a failed start.

It has been seen how removing the key with an evaluation still under way gives rise to detection of a failed start and, as a further consequence, the fault index for determining malfunctions not signalled by the standard diagnostics is incremented Said increment is decided on the basis of the number of TDCs that have elapsed and on the basis of whether or not the emergency action has been activated and whether or not it has had time to make its effects felt.

According to a preferred embodiment, the stored value Vmem for fuel volatility is updated as a function of the correction value Vcorr by using a confidence automaton implemented in the updating block 25. The stored value Vmem for fuel volatility is deemed to be confirmed if the difference between the measured value MarkMeas for starting quality and the predicted value MarkPred for starting quality is in absolute terms below a predetermined threshold value (for example 0.5). When a stored value Vmem for fuel volatility is confirmed, said value is stored in a reference value Vref, which takes the reference significance with regard to the fuel volatility value; in other words, the variable Vref represents the "plausible" value for fuel volatility that can be used in the event of "blinding" of the strategy due to malfunction detected by the standard diagnostics.

The confidence automaton is based on the number of consecutive times for which the stored value Vmem for volatility has been confirmed during previous cold starts.

For each confirmation, confidence increases by a value that is a function of the temperature TH2O of the liquid coolant on starting and the reference value Vref for fuel volatility is equal to the stored value Vmem for volatility. When such confirmation is not obtained, confidence in the volatility reference value Vref is decremented by a given value. Simultaneously, a discrete value for fuel volatility is calculated on the basis of the correction value Vcorr (function of the difference between the measured rating MarkMeas and the predicted rating MarkPred), in the case of nominal identification; so decrementing the stored value Vmem for volatility by a predetermined value DeltaVemergency and actually setting it directly to a value close to the minimum volatility value in the event of emergency action. The fuel volatility value Vmem is calculated by means of a weighted mean between the reference value and the identified discrete value in which the weighting associated with the reference value Vref is equal to said confidence.

In the case of non-emergency identification, calculation of the stored value Vmem for fuel volatility is directly consequent upon the discrete calculation and the new enrichment percentage % Enrich is calculated on the basis of the new stored value Vmem for fuel volatility. In the case of emergency identification, calculation of the enrichment is carried out directly on the basis of the discrete value (so as to obtain maximum enrichment during starting) and only at the end of starting is a calculation made of the volatility value Vmem to be used for the subsequent journey.

Introduction of the concept of confidence has the advantage of filtering out possible misidentifications due to the occurrence of discrete problems not detected by the diagnostics or to non-reproducible sporadic events in engine behaviour in response to this enrichment stimulus. In this manner, identification is achieved, which gradually proceeds more quickly the longer a phenomenon persists (confidence reduces progressively until, if appropriate, it reaches a value of zero, at which point the weighted average no longer has any effect), while avoiding giving credit to minor disturbances.

The first time that a new petrol volatility value is to be confirmed, it is rewritten into the reference variable Vref for fuel volatility and it is assigned a confidence equal to an increment thereof.

Conceptually, the situation described above is equivalent to stating that a weighted mean is calculated between the discrete volatility value that has just been determined and the reference value Vref, in which the weightings are a function of the number of times for which the reference value Vref for fuel volatility has been confirmed in previous cold starts of the engine 1 and of the temperature at which these confirmations have been made.

Information regarding the level of fuel in the tank constitutes a further condition for reducing/zeroing the confidence in the reference volatility value (Vref).

Alternatively, the fuel volatility value Vmem can be determined via a weighted mean, which involves the discrete volatility value that has just been calculated and previous confirmed volatility values. In this case, the weightings for each reference volatility could, in addition to the number of times for which they have been confirmed, also be a function of the date on which each confirmation took place; in this manner, the oldest confirmations can be eliminated.

According to one possible embodiment, the signal from the lambda probe 11 arranged in the exhaust system 10 can be used to verify the correctness of the previously determined correction value Vcorr, when the signal from the probe could not yet be expected because the sensor is not operational during the very first phases of starting.

According to a further embodiment, the fuel volatility value Vmem used to modify the enrichment of the mixture can be used to modify the parameters that control compensation of the fluid film phenomenon (also known as "wall wetting"), in particular with regard to compensation of said phenomenon when cold and thus for temperatures below a given threshold. The fluid film phenomenon is due to the fact that the petrol sprayed by each injector 12, on impacting the walls of the intake duct 4, is deposited thereon and then evaporates again with its own dynamics so as to participate in subsequent combustion phases; said fluid film phenomenon is responsible for drivability and emissions in transients and is particularly significant when the engine 1 is cold.

As shown in FIG. 5, the control method includes determining, before starting the engine, an enrichment percentage (% Enrich) as a function of a stored value (Vmem) for fuel volatility and as a function of the temperature (TH2O) of a liquid coolant of the engine. Then, the control method starts the engine using the previously determined enrichment percentage (% Enrich). Next, the control method determines a measured value (MarkMeas) for starting quality during an initial rise in the speed RPM of the engine as a function of the stored value (Vmem) for fuel volatility and as a function of the temperature (TH2O) of the liquid coolant of the engine on starting. The control method determines a predicted value (MarkPred) for starting quality before performing starting, determines a measured value (MarkMeas) for starting quality during an initial rise in the speed RPM of the engine and at the beginning of the third TDC counting from the one at which the rise in the speed of the engine occurs, and determines a correction value (Vcorr) of the stored value (Vmem) for fuel volatility as a function of the comparison between the measured value (MarkMeas) for starting quality and the predicted value (MarkPred) for starting quality. Finally, the control method updates the stored value (Vmem) for fuel volatility by applying the correction value (Vcorr) to said stored value (Vmem).

Various experimental tests have revealed that the method described above for determining fuel volatility and consequently performing cold starting of an internal combustion engine has numerous advantages; in particular, it is capable of determining rapidly and with a good degree of accuracy the volatility of the petrol used, so allowing cold starting to be performed ideally under any climatic conditions. Thanks to the implementation of the above-described method for determining fuel volatility, one and the same engine can be sold in all the markets of the world without being adapted to the characteristics of the types of petrol in the individual local markets because the engine is entirely capable of adapting itself, by itself determining the volatility of the fuel used.

The invention claimed is:

1. A method for determining fuel volatility and consequently performing cold starting of an internal combustion engine, the method comprises the steps of:
   determining, before starting the engine, an enrichment percentage (% Enrich) as a function of a stored value (Vmem) for fuel volatility and as a function of the temperature (TH2O) of a liquid coolant of the engine;
   starting the engine using the previously determined enrichment percentage (% Enrich);
   determining a predicted value (MarkPred) for starting quality before performing starting as a function of the stored value (Vmem) for fuel volatility and as a function of the temperature (TH2O) of the liquid coolant of the engine on starting;
   determining a measured value (MarkMeas) for starting quality during an initial rise in the speed (RPM) of the engine and at the beginning of the third TDC counting from the one at which the rise in the speed (RPM) of the engine occurs;
   determining a correction value (Vcorr) of the stored value (Vmem) for fuel volatility as a function of the comparison between the measured value (MarkMeas) for starting quality and the predicted value (MarkPred) for starting quality; and
   updating the stored value (Vmem) for fuel volatility by applying the correction value (Vcorr) to said stored value (Vmem);
   wherein, if cold starting of the engine is completed satisfactorily, the measured value (MarkMeas) for starting quality is determined as a function of a delay with which the rise in the speed (RPM) of the engine occurred and as a function of a rate of rise in the speed (RPM) of the engine during an initial rise in the speed (RPM) of the engine calculated at the beginning of the third TDC counting from the one at which the rise in the speed (RPM) of the engine occurs.

2. The method according to claim 1, wherein, once the stored value (Vmem) for fuel volatility has been updated by applying the correction value (Vcorr) to said stored value (Vmem), further comprising the step of updating the currently used enrichment percentage (% Enrich) as a function of the new stored value (Vmem) for fuel volatility.

3. The method according to claim 1, wherein the stored value (Vmem) for fuel volatility is increased if the predicted value (MarkPred) for starting quality is worse than the measured value (MarkMeas) for starting quality, and the stored value (Vmem) for fuel volatility is reduced if the predicted value (MarkPred) for starting quality is better than the measured value (MarkMeas) for starting quality.

4. The method according to claim 1, wherein the rise in engine speed is identified by detecting the presence of a first effective explosion and by detecting a difference between the value of the engine speed (rpm) evaluated after a given number of TDCs counting from the one at which the first effective explosion occurred and the value of the engine speed (rpm) preceding said first effective explosion.

5. The method according to claim 4, wherein the rise in engine speed is identified only if the difference between the value of the engine speed (rpm) evaluated after a given number of TDCs counting from the one at which the first effective explosion occurred and the value of the engine speed (rpm) preceding said first effective explosion is greater than a predetermined threshold value.

6. The method according to claim 1, wherein the rate of rise in the speed (RPM) of the engine is determined at the beginning of the third TDC counting from the one at which the rise in the speed (RPM) of the engine occurs as the difference between the current value of engine speed (rpm) and the value of the engine speed (rpm) preceding the TDC where said rise occurs.

7. The method according to claim 1, wherein the delay with which the rise in the speed (RPM) of the engine occurred is determined by measuring the interval that elapses between the beginning of starting and the moment at which a significant rate of rise in the speed (RPM) of the engine is detected.

8. The method according to claim 1, wherein the delay with which the rise in the speed (RPM) of the engine occurred is determined by measuring the interval that elapses between the beginning of starting and the moment at which the speed (RPM) of the engine exceeds a predetermined threshold value.

9. The method according to claim 1, wherein the measured value (MarkMeas) for starting quality is estimated to be equal to a constant, positive initial value from which is subtracted a first positive adjustment value that is a function of the delay with which the rise in the speed (RPM) of the engine occurred and to which is algebraically summed a second adjustment value, which is a function of the rate of rise in the speed (RPM) of the engine.

10. The method according to claim 9, wherein the first adjustment value is obtained by subtracting a constant penalty value for each TDC that elapses between the beginning of starting the engine and the moment at which a sufficiently significant rate of rise in the speed (RPM) of the engine is detected.

11. The method according to claim 9, wherein the first adjustment value is obtained by subtracting a constant penalty value for each TDC that elapses between the beginning of starting of the engine and the moment at which the speed (RPM) of the engine exceeds a predetermined threshold value.

12. The method according to claim 10, wherein the initial value is equal to 9 and the constant used for calculating the first adjustment value is equal to 0.38.

13. The method according to claim 9, wherein the second adjustment value is selected from a range by comparing the rate of rise in the speed (RPM) of the engine with a reference rate of rise.

14. The method according to claim 13, wherein the range used for calculating the second adjustment value is between +1 and −2.75.

15. The method according to claim 1, wherein the measured value (MarkMeas) for starting quality is estimated to be equal to a constant, positive initial value from which a first positive adjustment value is subtracted if an appreciable delay in the rise in the speed (RPM) of the engine has been detected, or to which a second adjustment value is algebraically summed if no appreciable delay in the rise in the speed (RPM) of the engine has been detected.

16. The method according to claim 15, wherein the first adjustment value is applied if no significant rise in engine speed is detected after a given number of explosions from starting; the first adjustment value is increased by a constant penalty value for each TDC that elapses between the moment at which starting of the engine begins and the moment at which the speed (RPM) of the engine exceeds a predetermined threshold value.

17. The method according to claim 16, wherein the initial value of the measured value (MarkMeas) for starting quality is equal to 9 and the constant penalty value of the first adjustment value is equal to 0.38 for each TDC.

18. The method according to claim 15, wherein the second adjustment value is a function of the rate of rise in the speed (RPM) of the engine and is selected from a range by comparing the rate of rise in the speed (RPM) of the engine with a reference rate of rise.

19. The method according to claim 18, wherein the rate of rise in the speed (RPM) of the engine is determined at the beginning of the third TDC, at the first TDC subsequent to the third explosion in absolute terms from starting and identified as the difference in revolutions between the value obtained at the third explosion and the most recent driven value preceding the first explosion of the engine in absolute terms, if greater than a predetermined threshold value.

20. The method according to claim 9, wherein the initial value is equal to 9 and the range used for calculating the second adjustment value is between +1 and −2.75.

21. The method according to claim 9, wherein the measured value (MarkMeas) for starting quality is saturated in order always to be within a predefined range.

22. The method according to claim 21, wherein the predefined range of the measured value (MarkMeas) for starting quality is between 0 and 10.

23. The method according to claim 1, wherein, if cold starting of the engine is not completed satisfactorily, i.e. the engine stops while an evaluation is under way, the measured value (MarkMeas) for starting quality is set to the minimum full scale value.

24. The method according to claim 1, wherein the enrichment percentage (% Enrich) is variable over time between an initial maximum value in absolute terms and a final, zero value.

25. The method according to claim 24, wherein the enrichment percentage (% Enrich) is implemented by means of a first contribution, which acts on the objective mixture concentration and a second residual correction contribution, which acts directly on the objective amount of petrol.

26. The method according to claim 25, wherein each contribution falls in value over time in accordance with an exponential decay law.

27. The method according to claim 25, wherein a first decay time constant of the first concentration contribution is less than a second decay time constant of the second residual correction contribution.

28. The method according to claim 25, wherein the first time constant and the second time constant are calculated as a function of the stored value (Vmem) for fuel volatility and of the initial value of a temperature (TH2O) of a liquid coolant of the internal combustion engine.

29. The method according to claim 28, wherein the first decay time constant of the first concentration contribution is approximately one third of the second decay time constant of the second residual correction contribution.

30. The method according to claim 24, wherein, following updating of the stored value (Vmem) for fuel volatility, the enrichment under way is modified accordingly, either by updating the amount of the enrichment as a function of the new stored value (Vmem) for fuel volatility or by updating the dynamics of the extinction profile of said enrichment.

31. The method according to claim 30, wherein the amount of the enrichment is updated on the basis of the value of the ratio between the new enrichment percentage (% Enrich) determined on the basis of the new stored value (Vmem) for fuel volatility and the enrichment percentage (% Enrich) used on initial starting.

32. The method according to claim 30, wherein the dynamics of the extinction profile of said enrichment are updated by updating the values of the time constants as a function of the new stored value (Vmem) for fuel volatility.

33. The method according to claim 1, wherein the start is deemed significant for the purposes of updating the stored value (Vmem) for fuel volatility only if at least a predetermined time interval has elapsed since the internal combustion engine was last turned off.

34. The method according to claim 33, wherein the time interval is determined in such a manner as to ensure that all the components of the engine reach a temperature equivalent to the outside temperature.

35. The method according to claim 1, wherein the stored value (Vmem) for fuel volatility is updated, using the correction value Vcorr, only if the initial temperature (TH2O) of a liquid coolant for the engine before starting is within a given temperature range.

36. The method according to claim 35, wherein the temperature range has a lower limit, which ensures that each component of the starting system is perfectly functional and behaves repeatably (lower limit), and an upper limit, which ensures that fuel volatility has an influence on starting quality.

37. The method according to claim 36, wherein the stored value (Vmem) for fuel volatility is updated, using the correction value Vcorr, only if the initial temperature (TH2O) of a liquid coolant of the engine before starting is between −25° C. and 10° C.

38. The method according to claim 1, wherein the stored value (Vmem) for fuel volatility is updated, using the correction value Vcorr, only if atmospheric pressure is greater than a predetermined threshold value.

39. The method according to claim 1, wherein the stored value (Vmem) for fuel volatility is not updated, using the correction value Vcorr, if there are engine malfunction signals present that may have an impact on starting quality.

40. The method according to claim 39, wherein, if engine malfunction signals identified by a standard diagnostic system are present that may have an impact on starting quality, then the enrichment percentage (% Enrich) is determined as a function of a stored reference value (Vref) for fuel volatility that is dependent on the values used in previous starts.

41. The method according to claim 1, wherein the stored value (Vmem) for fuel volatility is not updated if any malfunction condition not detectable by the standard diagnostic system and that may have an impact on starting quality is determined.

42. The method according to claim 41, wherein, if a malfunction condition that may have an impact on starting quality is determined, then the enrichment percentage (% Enrich) is determined as a function of a predetermined recovery value (V_recovery) for fuel volatility, which recovery value (V_recovery) makes it possible to start the car within an acceptable number of attempts, irrespective of the volatility value of the fuel actually present in the tank.

43. The method according to claim 1, wherein, if the mean of the most recent measured values (MarkMeas) for starting quality is below a given threshold value, an engine malfunction condition is determined.

44. The method according to claim 1, wherein, if the mean of the differences between the most recent predicted values (MarkPred) for starting quality and the corresponding measured values (MarkMeas) for starting quality is greater than a given threshold value, an engine malfunction condition is determined.

45. The method according to claim 1, wherein an error index is calculated, which is incremented by an amount depending on the number of TDCs of each failed start that resulted in the engine coming to a stop; and if the value of the error index is greater than a predetermined threshold value an engine malfunction condition is determined.

46. The method according to claim 45, wherein the error index is set to zero after a predetermined number of consecutive and unproblematic cold starts.

47. The method according to claim 45, wherein the error index is set to zero when an unproblematic start/restart is detected that occurs within a given maximum number of attempts.

48. The method according to claim 1, wherein, if after a predetermined number of TDCs from the beginning of starting, the engine has not started, then the currently used enrichment percentage (% Enrich) is incremented.

49. The method according to claim 1, wherein a cold start of the engine is judged problematic if the difference between the predicted value (MarkPred) for starting quality and a current estimate of the measured value (MarkMeas) for starting quality is greater than a predetermined threshold value.

50. The method according to claim 1, wherein a cold start of the engine is judged problematic if the number of TDCs characterising the step that precedes the onset of established running of the engine exceeds a predetermined threshold value.

51. The method according to claim 49, wherein, once a problematic starting situation has been determined, then emergency action is implemented in which the currently used enrichment percentage (% Enrich) is updated as a function of an emergency value (Vemergency) for fuel volatility, which is equal to the fuel volatility value used at the beginning of starting decremented by a predetermined decrement value (DeltaVemergency).

52. The method according to claim 51, wherein the decrement value (DeltaVemergency) is such as to cause the emergency value (Vemergency) for fuel volatility to take a value close to the minimum possible value.

53. The method according to claim 1, wherein a problematic cold restart condition is determined when the engine is not yet warmed up, the temperature (TH2O) of a liquid coolant is below an upper limit that permits identification of fuel volatility, and the difference between the predicted value (MarkPred) for starting quality and a current estimate of the measured value (MarkMeas) for starting quality is greater than a predetermined threshold value; in the case of a problematic cold restart condition, if the stored value (Vmem) for fuel volatility is high enough to be considered potentially problematic due to the consequent thinning because it is greater than the value that permits starting within an acceptable number of attempts irrespective of the volatility of fuel actually present in the tank, if the presence of system malfunctions not signalled by the standard diagnostics and responsible for the problematic starting can be excluded with sufficient certainty, and if the previous start was also problematic, then emergency action is taken in which the currently used enrichment percentage (% Enrich) is determined as a function of an emergency value (Vemergency) for fuel volatility, which is equal to the fuel volatility value used at the beginning of starting decremented by a predetermined decrement value (DeltaVemergency).

54. The method according to claim 53, wherein the decrement value (DeltaVemergency) is such as to cause the emergency value (Vemergency) for fuel volatility to take a value close to the minimum possible value.

55. The method according to claim 1, wherein a critical start/restart condition is determined when a start/restart occurs under any condition that is not perfectly covered by a case history of experimental data appropriate for defining the behaviour of the system.

56. The method according to claim 1, wherein, in the case of critical starting/restarting, if the stored value (Vmem) for fuel volatility is high enough to be considered potentially problematic due to the consequent thinning because it is greater than the value that permits starting within an acceptable number of attempts irrespective of the volatility of fuel actually present in the tank, and if the presence of system malfunctions not signalled by the standard diagnostics and responsible for the problematic starting can be excluded with some degree of certainty, then emergency action is taken in which the currently used enrichment percentage (% Enrich) is determined as a function of an emergency value (Vemergency) for fuel volatility, which is equal to the fuel volatility value used at the beginning of starting decremented by a predetermined decrement value (DeltaVemergency).

57. The method according to claim 56, wherein the decrement value (DeltaVemergency) is such as to cause the emergency value (Vemergency) for fuel volatility to take a value close to the minimum possible value.

58. The method according to claim 1, wherein the correction value (Vcorr) is obtained by multiplying the difference between the measured value (MarkMeas) for starting quality and the predicted value (MarkPred) for starting quality by a multiplicative constant.

59. The method according to claim 58, wherein the multiplicative constant takes two different values depending on whether the difference between the measured value (MarkMeas) for starting quality and the predicted value (MarkPred) for starting quality is positive or negative.

60. The method according to claim 58, wherein the correction value (Vcorr) is determined only if the number of successive TDCs that have occurred during the starting attempt is greater than a predetermined threshold value.

61. The method according to claim 60, wherein the correction value (Vcorr) is determined only if the number of successive TDCs that have occurred during the starting attempt is greater than 4.

62. The method according to claim 58, wherein, if the difference between the measured value (MarkMeas) for starting quality and the predicted value (MarkPred) for starting quality is in absolute terms below a given threshold value, then a value of zero is assigned to the correction value (Vcorr).

63. The method according to claim 1, wherein the stored value (Vmem) for fuel volatility is updated as a function of the correction value (Vcorr) by using a confidence automaton.

64. The method according to claim 63, wherein the stored value (Vmem) for fuel volatility is deemed to be confirmed if the difference between the measured value (MarkMeas) for starting quality and the predicted value (MarkPred) for starting quality is in absolute terms below a predetermined threshold value.

65. The method according to claim 64, wherein, when the stored value (Vmem) for fuel volatility is confirmed, then a reference value (Vref) for fuel volatility is assumed to be equal to the stored value (Vmem) for fuel volatility; and the confidence automaton is based on the number of times for which the reference volatility value (Vref) has previously been confirmed consecutively.

66. The method according to claim 65 in which, for each confirmation, the confidence value is increased by a quantity that is dependent on the temperature (TH2O) of the liquid coolant on starting.

67. The method according to claim 65, wherein, when a certain stored value (Vmem) for fuel volatility is not confirmed, then the confidence value of the reference value (Vref) is reduced.

68. The method according to claim 64, wherein the new stored value (Vmem) for fuel volatility is calculated via a weighted mean between the reference value (Vref) for fuel volatility and the quantity obtained as a sum of the stored value (Vmem) for fuel volatility on initial starting with the correction value (Vcorr) that has just been calculated; the weightings of the weighted mean are a function of the number of times for which the reference value (Vref) for fuel volatility has been confirmed in previous cold starts of the engine.

69. The method according to claim 64, wherein the number of times for which a certain stored value (Vmem) for fuel volatility has been confirmed is stored.

70. The method according to claim 69, wherein the number of times for which a certain stored value (Vmem) for fuel volatility has been confirmed is stored and the date of each confirmation is stored.

71. The method according to claim 70, wherein the oldest confirmations are eliminated.

72. The method according to claim 71, wherein the new stored value (Vmem) for fuel volatility is calculated via a weighted mean between the previously stored confirmed reference values for fuel volatility and the quantity obtained as a sum of the stored value (Vmem) for fuel volatility on initial starting with the correction value (Vcorr) that has just been calculated; the weightings are a function of the number of times for which each reference value (Vref) for fuel volatility has been confirmed in previous cold starts of the engine and of the date on which said confirmations occurred, the more recent being preferred.

73. The method according to claim 63, wherein, in the case of emergency action, with the sole exclusion of critical starting/restarting for the purposes of repeatability of the evaluation thereof, the stored value (Vmem) for fuel volatility is calculated by means of a weighted mean between the reference value (Vref) and an emergency value (Vemergency) for fuel volatility, which is equal to the fuel volatility value used at the beginning of starting decremented by a predetermined decrement value (DeltaVemergency); the weighting associated with the reference value (Vref) is equal to the confidence in said reference value (Vref).

74. The method according to claim 73, wherein the decrement value (DeltaVemergency) is such as to cause the emergency value (Vemergency) for fuel volatility to take a value close to the minimum possible value.

75. The method according to claim 63, wherein information regarding the level of fuel in a tank constitutes a further condition for enabling an emergency restart action and for reducing/zeroing the confidence in the reference volatility value (Vref).

76. The method according to claim 1, wherein a signal from a lambda probe (11) arranged in an exhaust system (10) of the engine is used to verify the correctness of the previously determined correction value (Vcorr).

77. The method according to claim 1, wherein the parameters used for compensation of the fluid film phenomenon are corrected as a function of the stored value (Vmem) for fuel volatility.

* * * * *